(12) United States Patent
Bertini

(10) Patent No.: US 10,265,883 B2
(45) Date of Patent: Apr. 23, 2019

(54) MACHINE TOOL

(71) Applicant: IMER INTERNATIONAL S.P.A., Poggibonsi (SI) (IT)

(72) Inventor: Antonio Bertini, Certaldo (IT)

(73) Assignee: IMER INTERNATIONAL S.P.A., Poggibonsi, (SI) (IT)

( * ) Notice: Subject to any disclaimer, the term of this patent is extended or adjusted under 35 U.S.C. 154(b) by 251 days.

(21) Appl. No.: 15/300,511

(22) PCT Filed: Jan. 22, 2015

(86) PCT No.: PCT/IT2015/000012
§ 371 (c)(1),
(2) Date: Sep. 29, 2016

(87) PCT Pub. No.: WO2015/151125
PCT Pub. Date: Oct. 8, 2015

(65) Prior Publication Data
US 2017/0106563 A1   Apr. 20, 2017

(30) Foreign Application Priority Data
Mar. 31, 2014   (IT) .................................. FI2014A0019

(51) Int. Cl.
*B28D 1/14*   (2006.01)
*B28D 1/18*   (2006.01)
(Continued)

(52) U.S. Cl.
CPC ............... *B28D 1/18* (2013.01); *B23D 41/02* (2013.01); *B23D 41/04* (2013.01); *B23Q 1/01* (2013.01);
(Continued)

(58) Field of Classification Search
CPC ... B28D 1/14; B28D 1/18; B28D 5/02; B28D 5/027; B28D 7/02; B28D 7/04;
(Continued)

(56) References Cited

U.S. PATENT DOCUMENTS 4,423,568 A * 1/1984 Gould ..................... B24B 55/06
144/251.2
4,516,357 A * 5/1985 Gach ..................... B23Q 1/015
451/231

(Continued)

FOREIGN PATENT DOCUMENTS

FR         1 006 588 A      4/1952
WO     2014097341 A1      6/2014

*Primary Examiner* — Eileen Morgan
(74) *Attorney, Agent, or Firm* — McGlew and Tuttle, P.C.

(57) ABSTRACT

Machine tool, comprising a base (1) with a bottom (10) and a peripheral wall (11) of predetermined height to delimit an internal volume of predetermined capacity and open at the top, in which on the upper edge of said wall (11) is placed, removably, a pierced cover (2), or a work-piece carrier surface provided with through holes (20) through which a refrigerant liquid is free to fall, and wherein an electric motor (4), on which is engaged a tool holder (7), is placed in said inner volume, and wherein said electric motor (4) is inserted in a protection chamber (5) which protects it from the refrigerant liquid passing through said holes (20). The electric motor (4) is connected to corresponding lowering and lifting means, by means of which the tool holder (7) is lowered and raised accordingly, so producing the lifting and lowering of a respective tool (3) through the cover (2).

12 Claims, 13 Drawing Sheets

(51) Int. Cl.
  *B28D 7/02* (2006.01)
  *B28D 7/04* (2006.01)
  *B24B 41/02* (2006.01)
  *B23D 41/02* (2006.01)
  *B23D 41/04* (2006.01)
  *B23Q 1/01* (2006.01)
  *B23Q 1/25* (2006.01)
  *B28D 5/02* (2006.01)

(52) U.S. Cl.
  CPC ............... *B23Q 1/25* (2013.01); *B24B 41/02* (2013.01); *B28D 1/14* (2013.01); *B28D 5/027* (2013.01); *B28D 7/02* (2013.01); *B28D 7/04* (2013.01)

(58) Field of Classification Search
  CPC ........ B24B 41/02; B23D 41/02; B23D 41/04; B23Q 1/01; B23Q 1/015; B23Q 1/25
  USPC .......................................................... 125/35
  See application file for complete search history.

(56) References Cited

U.S. PATENT DOCUMENTS

| | | | | |
|---|---|---|---|---|
| 4,551,948 A | * | 11/1985 | Kindig | B24B 9/08 144/286.1 |
| 5,345,726 A | * | 9/1994 | Gach | B24B 9/10 451/177 |
| 5,549,509 A | * | 8/1996 | Hirst | B24B 7/08 451/178 |
| 5,681,211 A | * | 10/1997 | Wiand | B24B 7/08 451/177 |
| 6,220,799 B1 | * | 4/2001 | Okutani | B23Q 1/012 29/26 A |
| 6,416,394 B1 | * | 7/2002 | Hacikyan | B24B 9/14 451/178 |
| 6,994,613 B2 | * | 2/2006 | Hacikyan | B24B 9/08 451/358 |
| 9,902,035 B2 | * | 2/2018 | Layton, Jr. | B24B 3/003 |
| 2011/0103913 A1 | * | 5/2011 | Nemec | B23D 37/08 409/244 |

* cited by examiner

MACHINE TOOL

DESCRIPTION

The present invention relates to a machine tool. In particular, a machine tool in accordance with the present invention is especially used on construction sites, for cutting and drilling of stone materials, tiles, slabs or wooden materials.

A machine of the type indicated above is known from PCT/IT2013/355.

The main purpose of the present invention is to further extend the operational capabilities of such a machine, making it even more versatile and even more performant. This result is achieved, according to the present invention, by adopting the idea of making a machine having the characteristics indicated in claim 1. Other features of the invention are the subject of the dependent claims.

Thanks to the present invention, is provided a machine for construction sites particularly simple from the constructive point of view that, at the same time, offers many possibilities of use even if used by not particularly skilled personnel. Moreover, a machine according to the present invention has a low cost in relation to the advantages offered and, thanks to its simplicity, maintains its characteristics even after intense and prolonged use.

These and other advantages and characteristics of the present invention will be best understood by anyone skilled in the art thanks to the following description and to the attached drawings, provided by way of example but not to be considered in a limiting sense, in which some parts are omitted to better illustrate other, in which.

Figure 1:
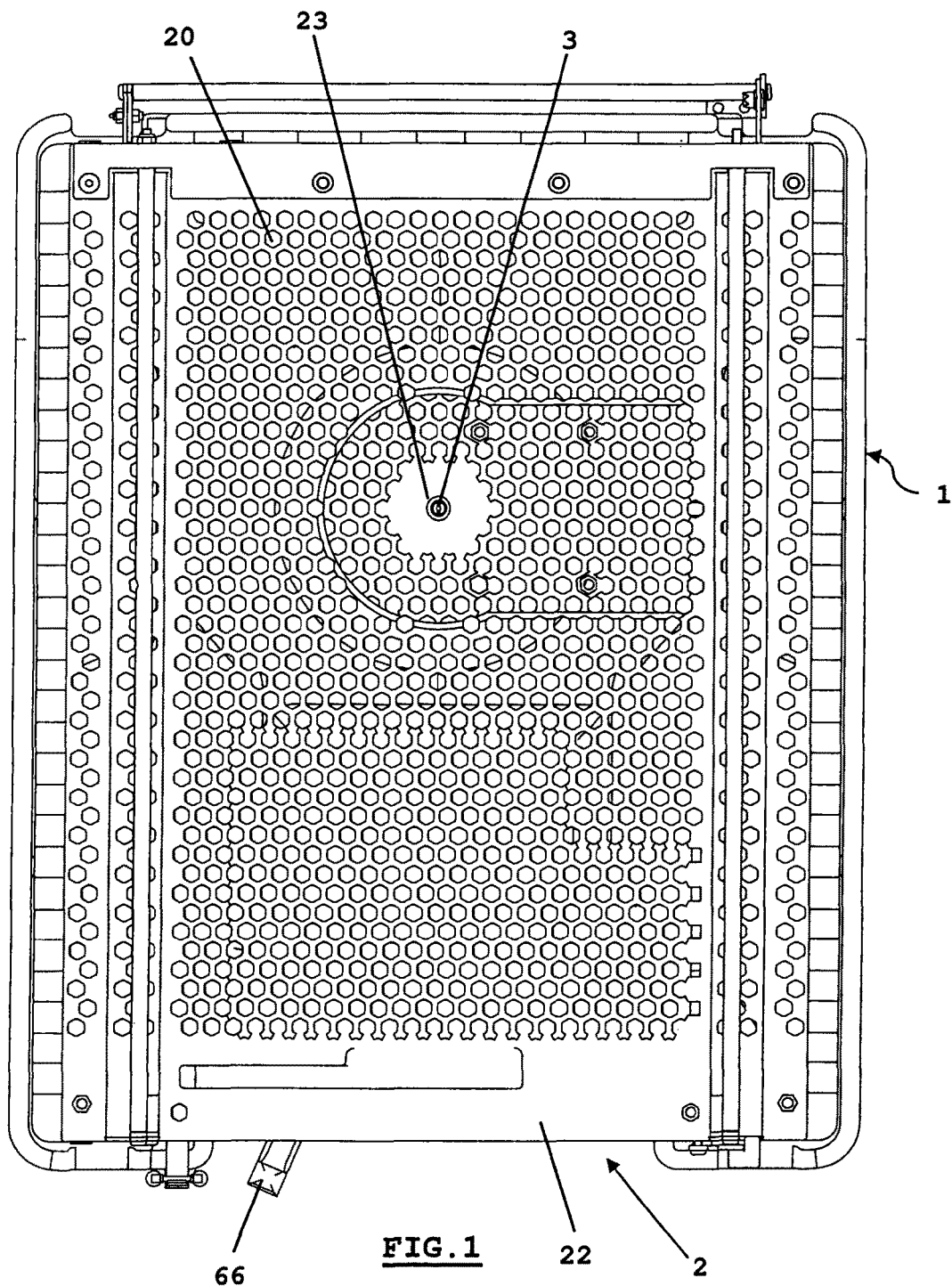
FIG. 1 is a schematic top plan view of a machine in accordance with the present invention.
Figure 2:
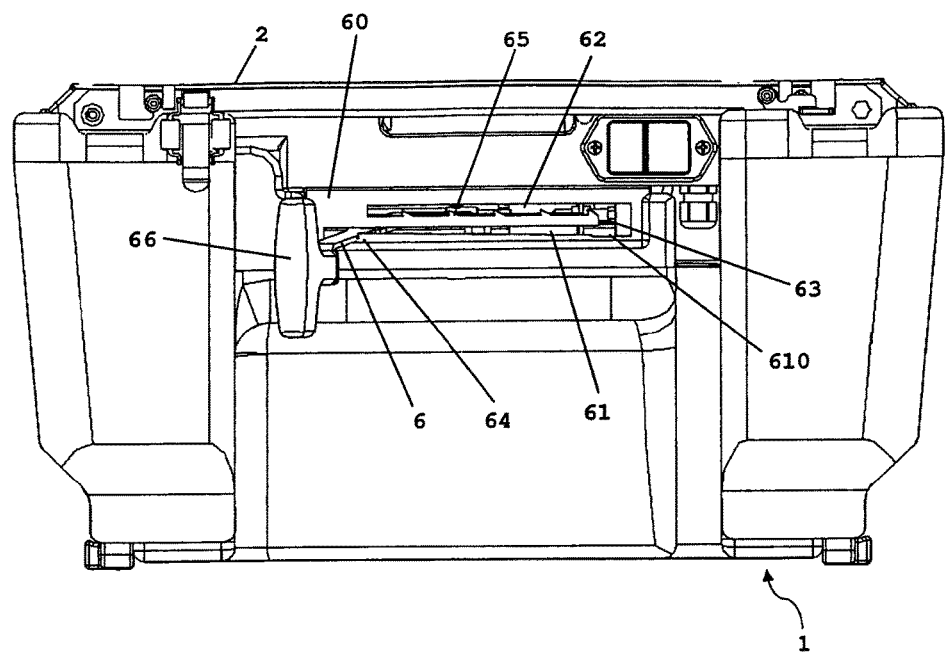
FIG. 2 is a schematic side view of the machine shown in FIG. 1.
Figure 3:
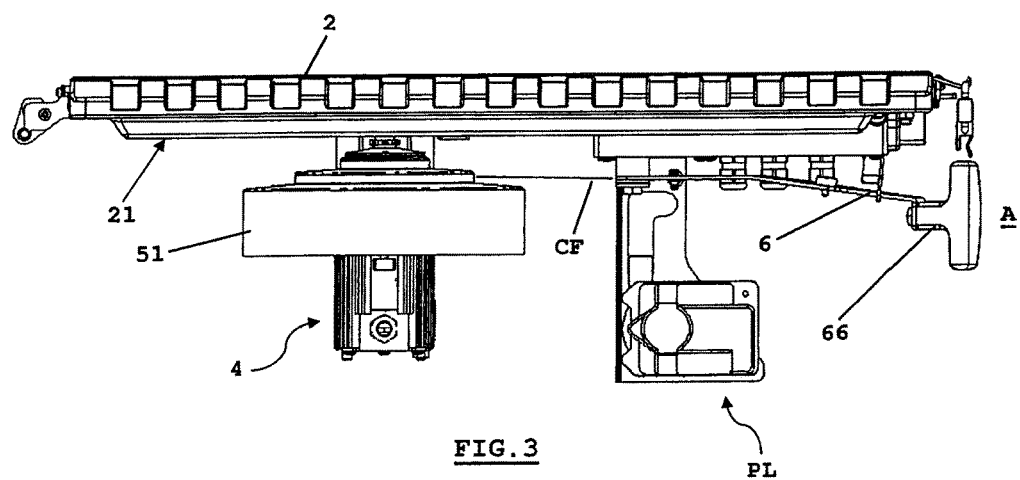
FIG. 3 is a schematic side view of the motor assembly of the machine shown in FIG. 1, with the respective operating members, the motor being completely lowered.
Figure 4:
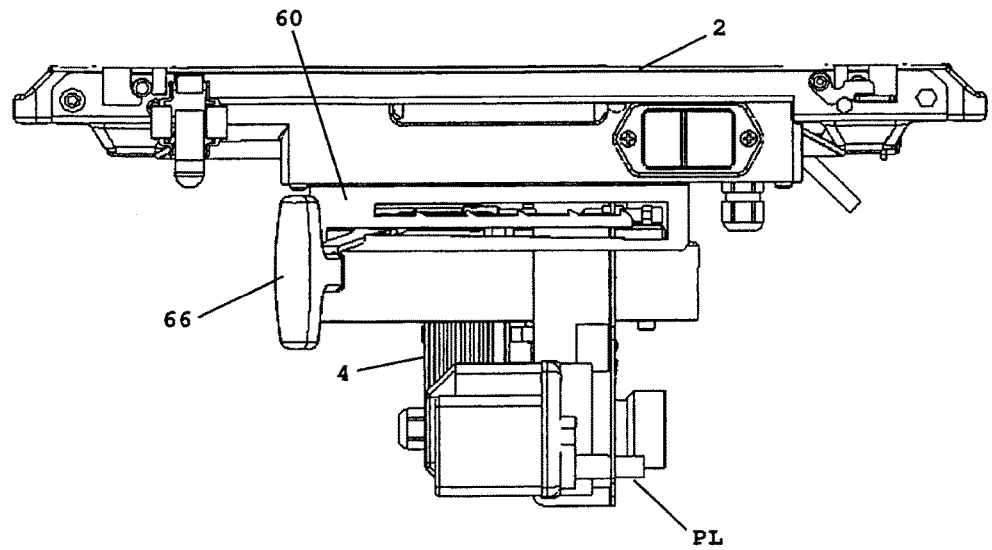
FIG. 4 is a view from "A" of FIG. 3.
Figure 5:
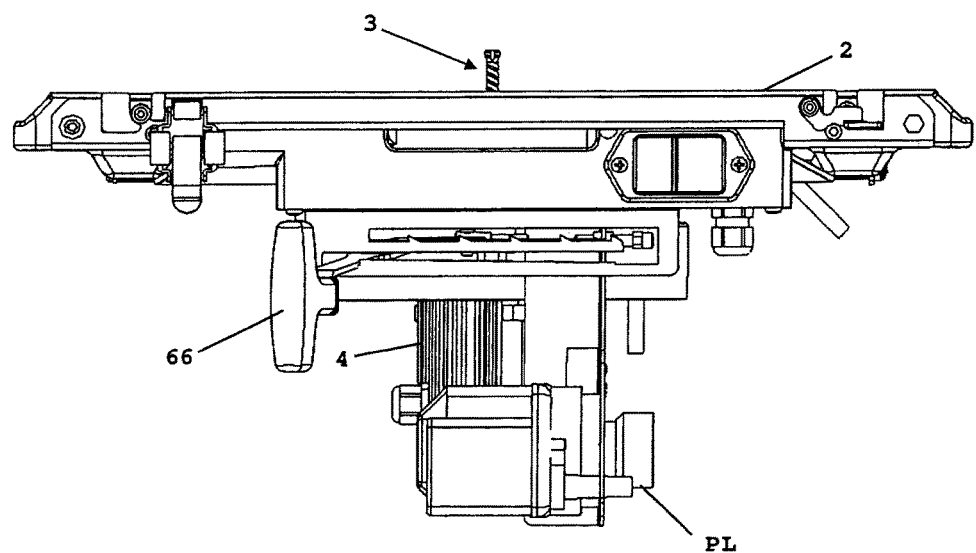
FIG. 5 is a view similar to that of FIG. 4 but with the motor fully raised and with the tool completely extracted.
Figure 6:
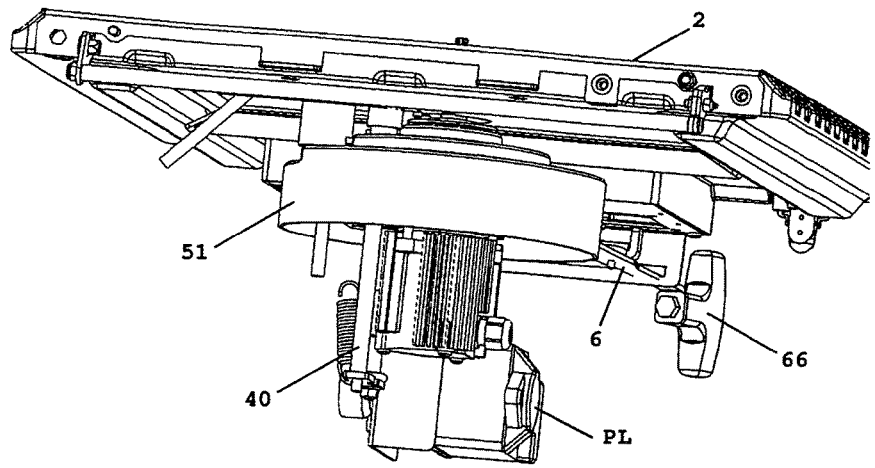
FIG. 6 is a schematic perspective view from below of the group shown in FIG. 5.
Figure 7:
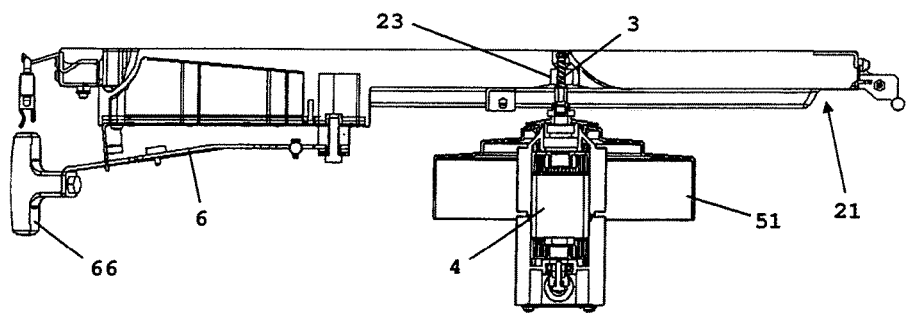
FIG. 7 is a schematic vertical sectional view of the group shown in FIG. 1.
Figure 8:
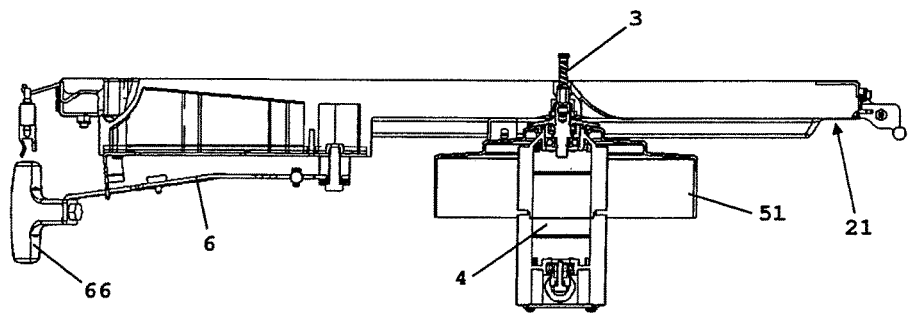
FIG. 8 is a schematic vertical sectional view of the group shown in FIG. 5.
Figure 9:
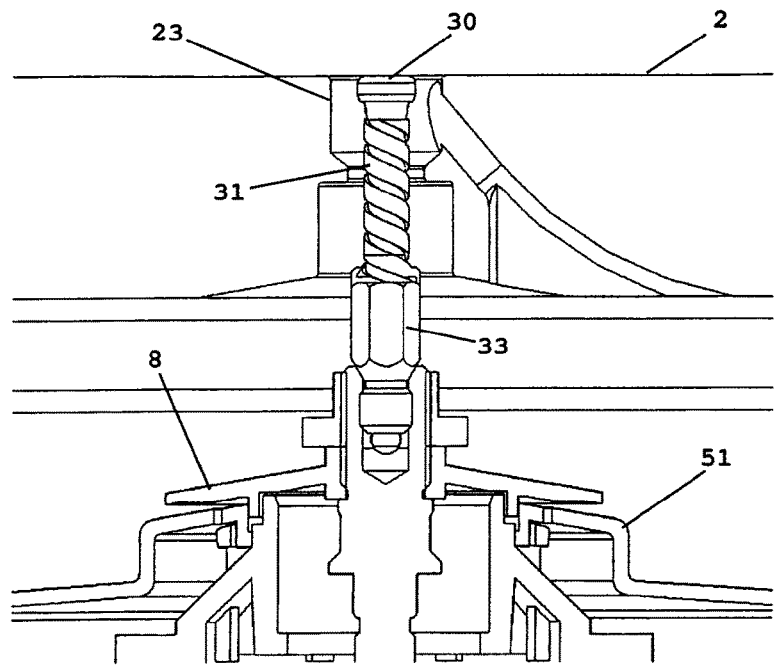
FIG. 9 is an enlarged detail of FIG. 7.
Figure 10:
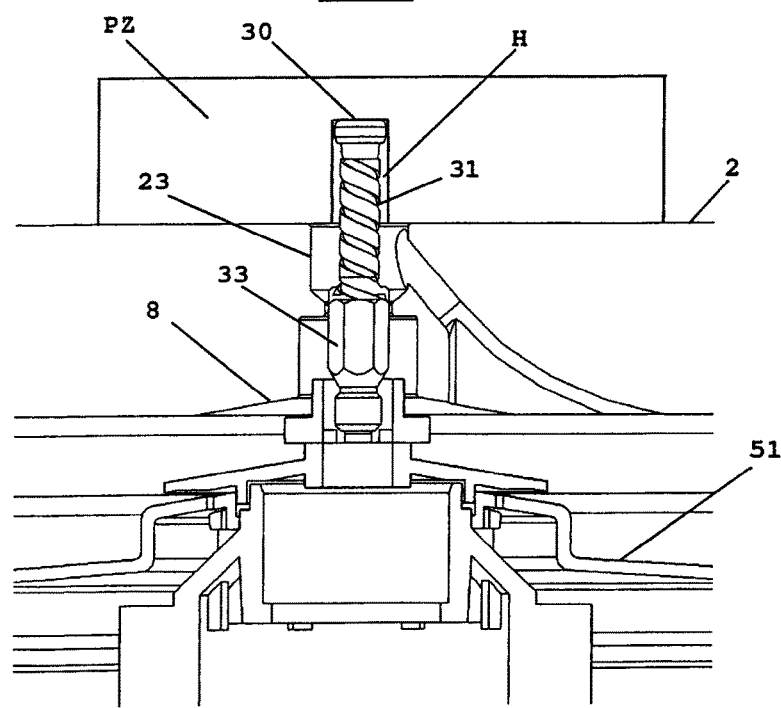
FIG. 10 is an enlarged detail of FIG. 8.
Figure 11:
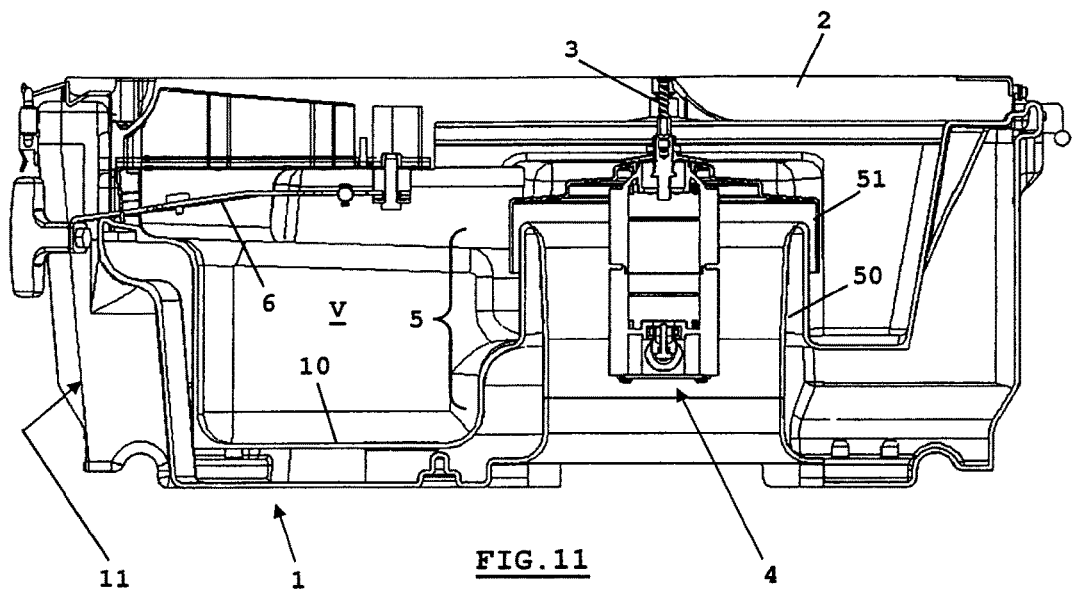
FIG. 11 is a schematic vertical sectional view of the machine shown in FIG. 1 and FIG. 2.
Figure 12:
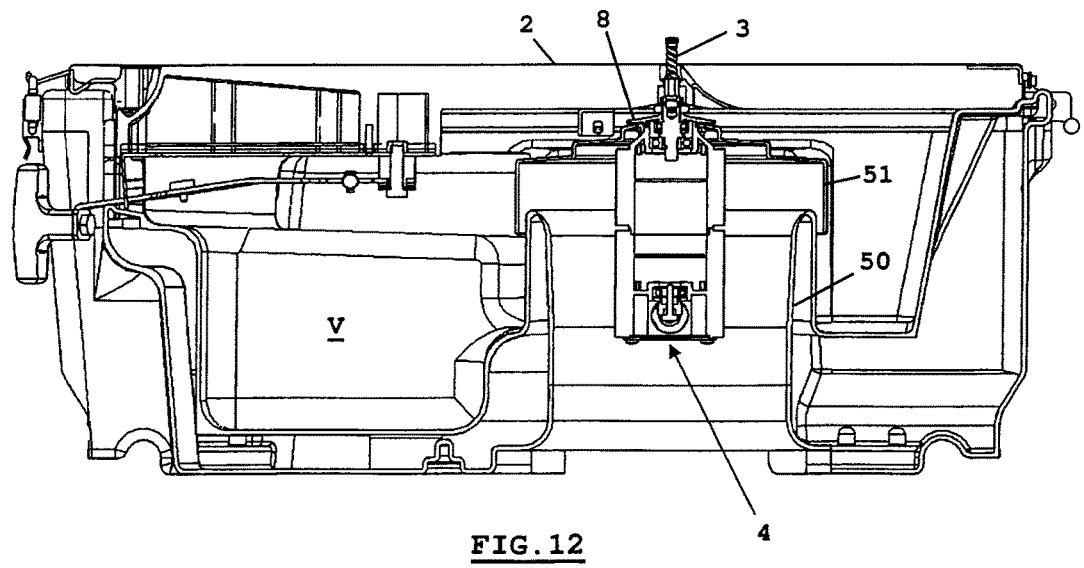
FIG. 12 is a schematic vertical sectional view of the machine of FIG. 1 with the motor unit positioned raised as in FIG. 5.
Figure 13:
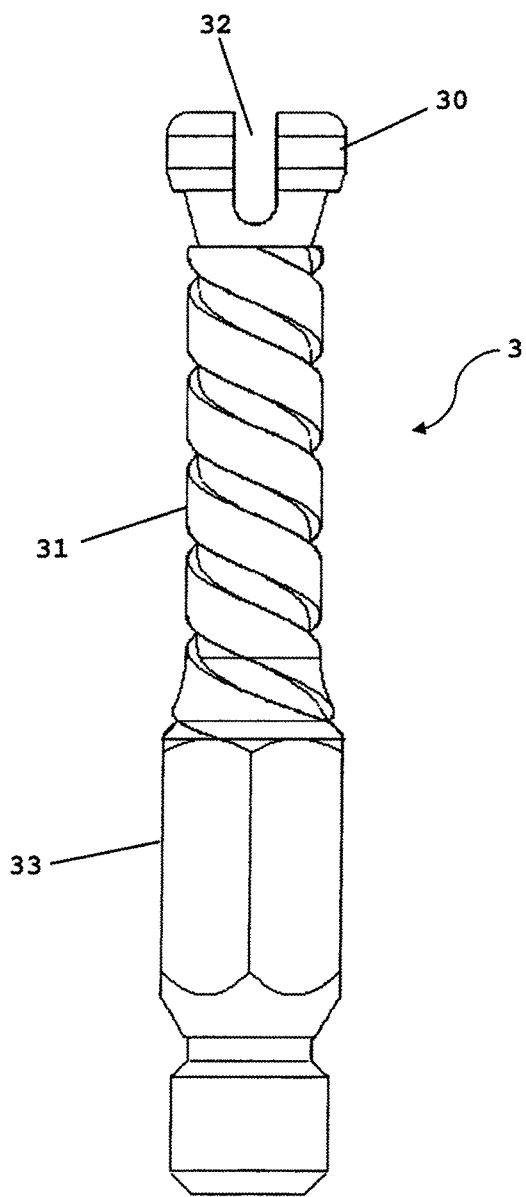
FIGS. 13 and 14 are respectively a side view and a perspective view of a tool that can be used in a machine in accordance with the present invention.
Figure 14:
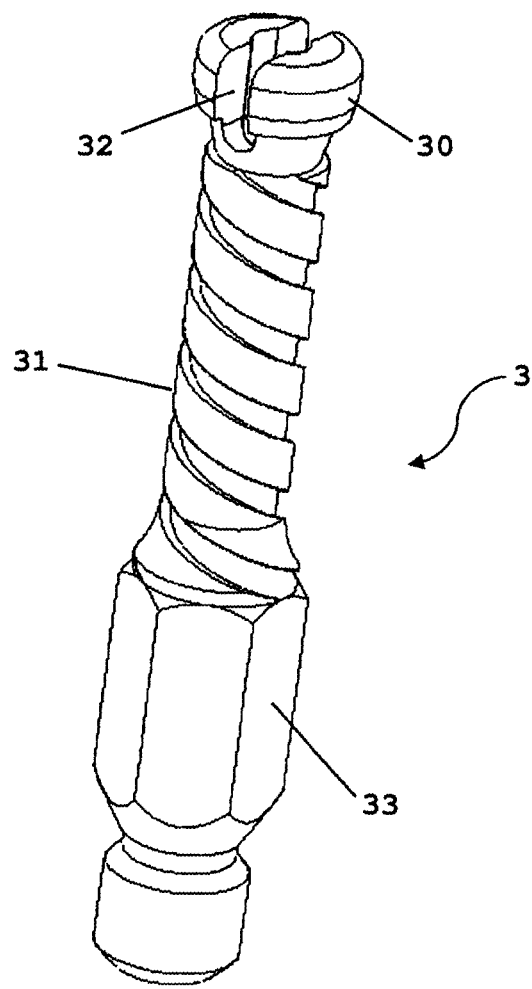

Reduced to its essential structure and with reference to the accompanying drawings, a machine according to the present invention comprises a base (1) with a bottom (10) and a peripheral wall (11) of predetermined height to delimit an internal volume of predetermined capacity and open upward. On the upper edge of said wall (11) is placed pierced removable cover (2). The through holes (20) of the cover (2) allow, as further described in the following flowing, towards the internal volume of the base (1), of the water used to cool a tool (3), also described in the following, that, on command, protrudes from the same cover (2). The latter has a lower surface (21) directed toward the bottom (10) of the base (1) and an opposite upper surface (22) on which is positioned the workpiece (for example a tile). Furthermore, the cover (2) has a hole (23) through which it is inserted the tool (3), that can be lowered and lifted. For example, the tool (3) is a diamond cutter, or a rotary tool engaged on an electric motor (4) with a high number of revolutions. For example, the motor (4) has a rotation speed comprised between 18,000 and 30,000 rpm.

The motor (4) is fixed to the cover (2), on the lower surface (21) of the latter and, in working position, is placed in a sealed chamber (5)—that is, a chamber that protects the motor (4) from the water coming from above—in said internal volume (V) of the base (1). In said volume (V) is located a pump (indicated with the reference 'PL' in the drawings) through which the liquid (eg water) which, coming from above through the holes (20) of the cover (2), is collected in the same volume (V) and is pumped towards the tool (3) to cool it. The connection of the motor (4) to the surface (21) of the cover (2) is further described in the following.

Said protection chamber (5) is in several parts: one part (50) is fixed and is constituted by a tubular appendage of the bottom of the base (1); another part (51) is integral to the motor (4), so that it follows the motor (4) when the latter is raised or lowered; still another part of the chamber (5) is constituted by a circular shield (8) constrained to the shaft of the motor (4) and located above the second part (51). In practice, the chamber (5) in which is positioned the motor (4) is a variable volume chamber (in the example, a telescopic chamber), whereby with the lifting and lowering of the motor (4) the sealing against the water that falls from above is still ensured. In particular, the second part (51) of the sealed chamber (5) has a peripheral edge of sufficient height to prevent the entry of water coming from above into the underlying fixed part (50) whatever the position of the motor (4) when the latter is raised or lowered. The second part (51) and the third part (8) of the chamber (5) are movable parts of the same. In fact, the second part (51) is integral to the motor (4) and follows its translational movement when the latter is lowered or raised. The shield (8) rotates since it is constrained coaxially to the motor shaft (4). Therefore, the chips falling from above during the machining invest the shield (8) that intercepts them and move them away from the motor (4) by centrifugal effect. The same applies to the water coming from above.

As previously mentioned, the motor (4) can be raised or lowered and, correspondingly, there is the extraction tool (3) grafted on the same motor or retraction thereof. The motor (4) is placed in the sealed chamber (5) in vertical position and the regulation of its vertical position is executed via a control lever (6).

More particularly, the housing of the motor (4) is constrained to two guide columns (40) by means of two perforated blocks (41) which are made integral with each other by means of a connecting plate (42) presenting an upper wing (43) provided with a hole to hook the head terminal (T) of a flexible cable (CF) that is further described in the following. A lower wing (44) of said plate (42) has a hole in which is engaged the upper end of a spring (45). The lower end of the latter is engaged in a hole of a second plate (46) which connects together the lower ends of the columns (40). Said mobile part (51) of the chamber (5) is fixed on the upper base of the casing of the motor (4).

Said flexible cable (CF) connects the lever (6) with the motor housing (4). Also, the lever (6) is inserted in a plate (60) provided with a slot with two horizontal tracks joined by a vertical section, with a lower track (61) and an upper track (62). In the accompanying drawings, the vertical section of said track is marked by the reference "63". The tracks (61, 62) are provided with locking teeth for the lever (6) at predetermined points of the same. The lower track (61) has only one tooth (64), at its initial part. The upper track (62) has five teeth (65). Each of said teeth defines a locking position of the lever (6) and, therefore, a position of the motor (4) and tool (3) engaged on it. More particularly, in accordance with the example shown in the attached drawings, the tooth (64) on the initial part of the lower track (61) defines a completely raised position of the motor (4), i.e. a position of the motor (4) such that the 'tool (3) is completely extracted and can then be disassembled. In this position, the shield (8) has one hole (80) in correspondence with a pin (81) presented by the bracket (211) described below; with the pin (81) inserted in the hole (80) the rotation of the motor shaft (4) is prevented. With the lever (6) in the position indicated by the reference '610', the spring (45) pulls the motor (4) downwards. To raise the motor (4), the lever (4) is slightly raised, so as to disengage it from the position (610), and is made to slide along the vertical section (63), until reaching the desired position on the top track (62) where it is blocked by the tooth (65) chosen. The user can select anyone of the positions defined by the locking teeth (65). The last tooth (65) of the upper track (62) defines a position of maximum lifting of the motor (4), and then of maximum extraction of the tool (3). The lever (6) is provided with a handle (66) for ease of use. The presence of the spring (45) allows to automatically bring the motor (4) in the initial position of tool (3) fully retracted when the lever (6) is in the respective position.

In this way, it is provided a system for adjusting the position of the motor (4), i.e. the tool (3), with the possibility to select any one of the positions preset by the manufacturer, without compromising the sealing of the chamber which houses the motor (4) in respect of the water falling from above.

According to the example shown in the drawings, the movable part (51) of said chamber (5) is constrained to the inner surface (21) of the cover (2) having two projections (510) on its top which are inserted slidably in two corresponding tubular bushes (210) presented by a bracket (211) integral to said surface (21).

According to the example shown in the drawings, the tool (3) has a head (30) of greater diameter than the stem (31). As a result of this shape of the tool (3) it provides a better chip evacuation in the drilling phase and at the same time a better cooling of the tool (3) through the gap (H), which thereby is formed in the workpiece (PZ). Furthermore, at the end of drilling, the workpiece is not in contact with any part of the tool (3), with all the advantages arising therefrom (including the fact that it avoids any abnormal wear of the tool due to the continuous rubbing) The tool (3), thanks to its shape, is capable of drilling, thanks to the head (30), and of cutting, with the stem (31) also equipped with a cutting edge. Preferably, the shank (33) is of greater diameter than the stem (31). When the tool (3) is raised, the shank (33) occludes from below the bore (23) in which is positioned the same tool (3), favoring the exit of the cooling water upward, that is, towards the cutting point. When the tool (3) is lowered such occlusion is eliminated, favoring the passage of the chip and freeing the gap (H).

Furthermore, the head (30) of the tool (3) is provided with a diametrical slot (32). It avoids applying abrasive material in the area of the central part where the cutting speed is zero or almost zero, and favors the escape of the chip from the cavity (H).

Figure 15:
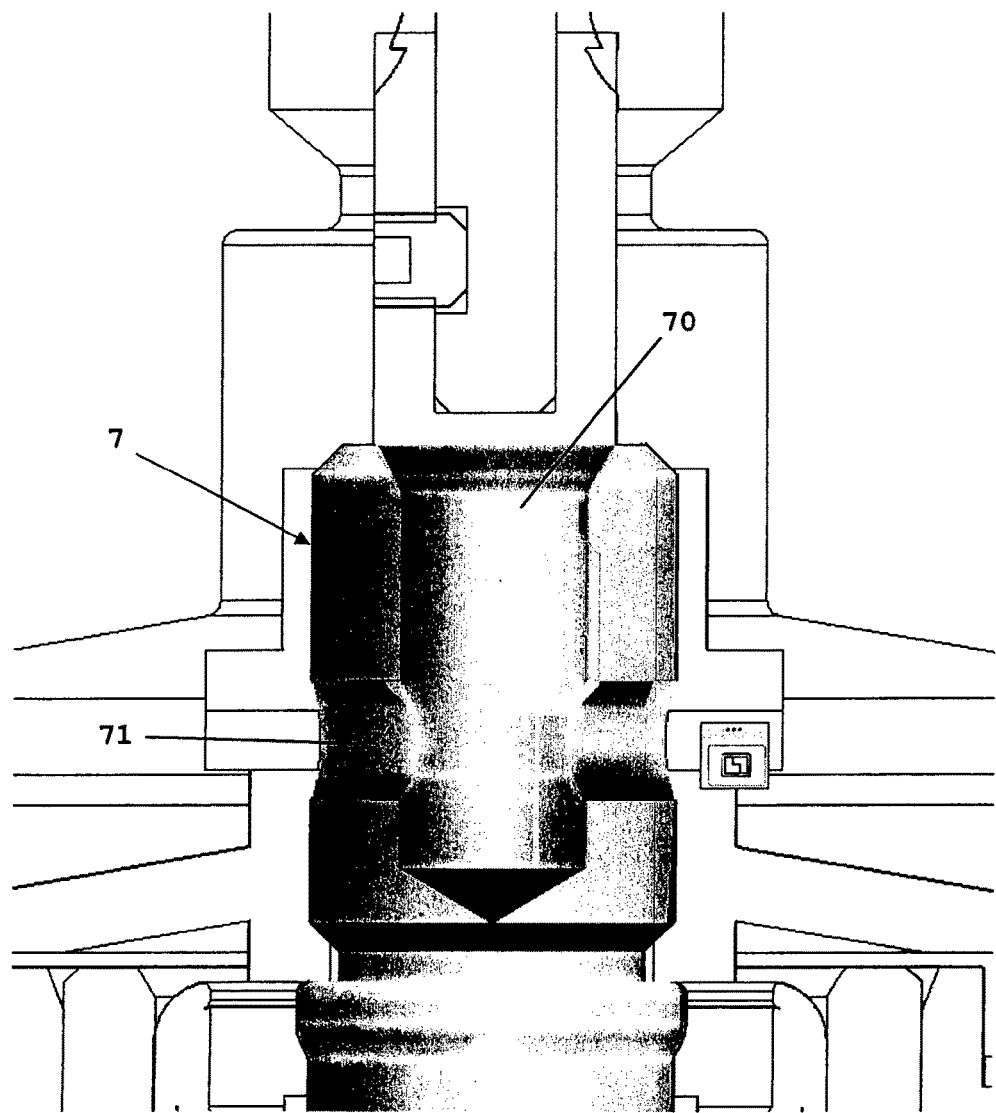
FIG. 15 is a schematic vertical sectional view of the mount for the tool.
Figure 16:
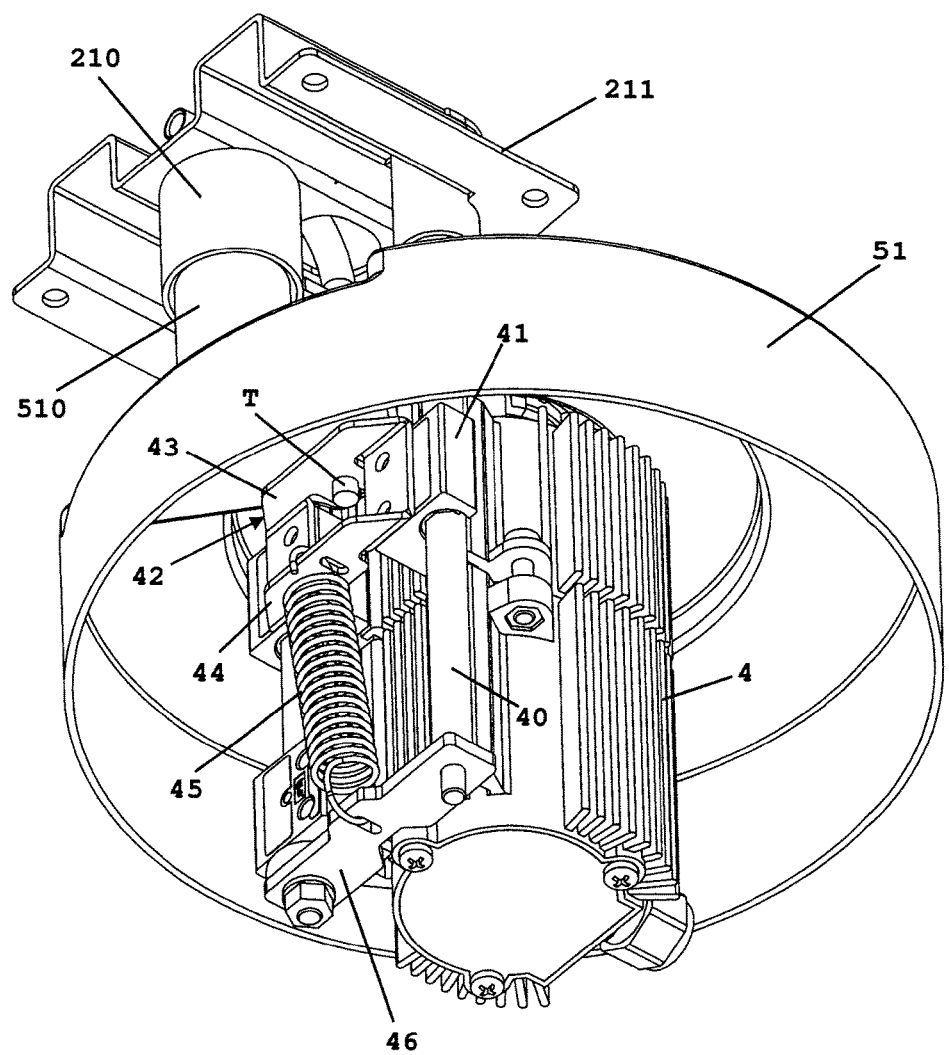
FIG. 16 is a perspective view from below of the motor.
Figure 17:
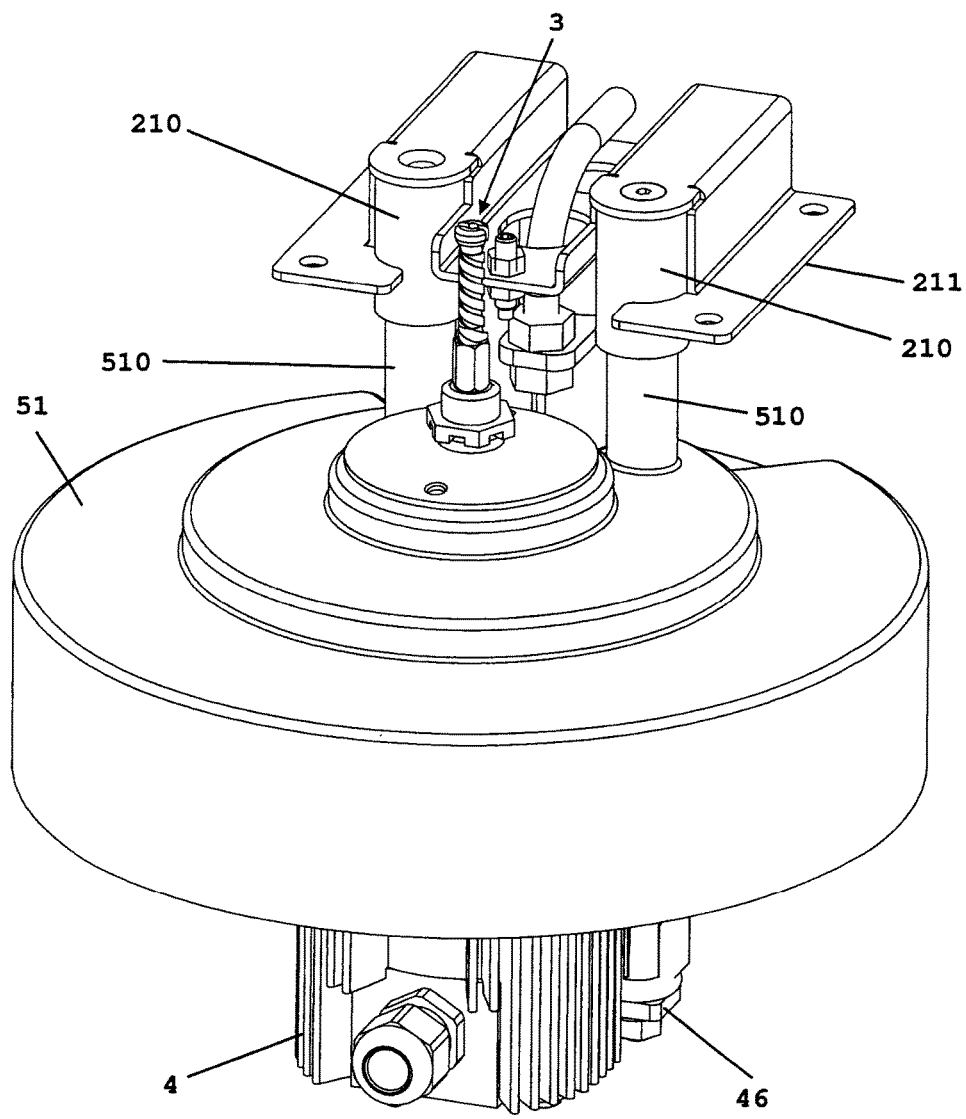
FIGS. 17-19 are additional perspective views of the motor.
Figure 18:
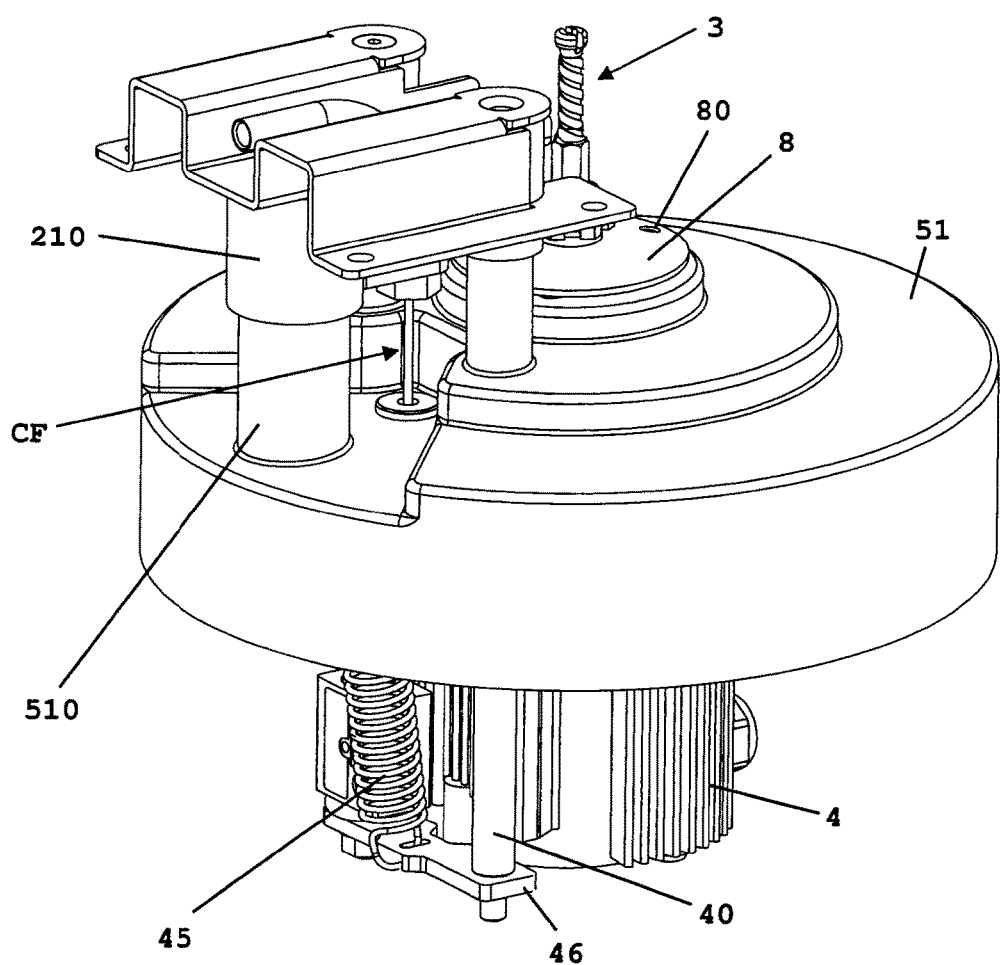
Figure 19:
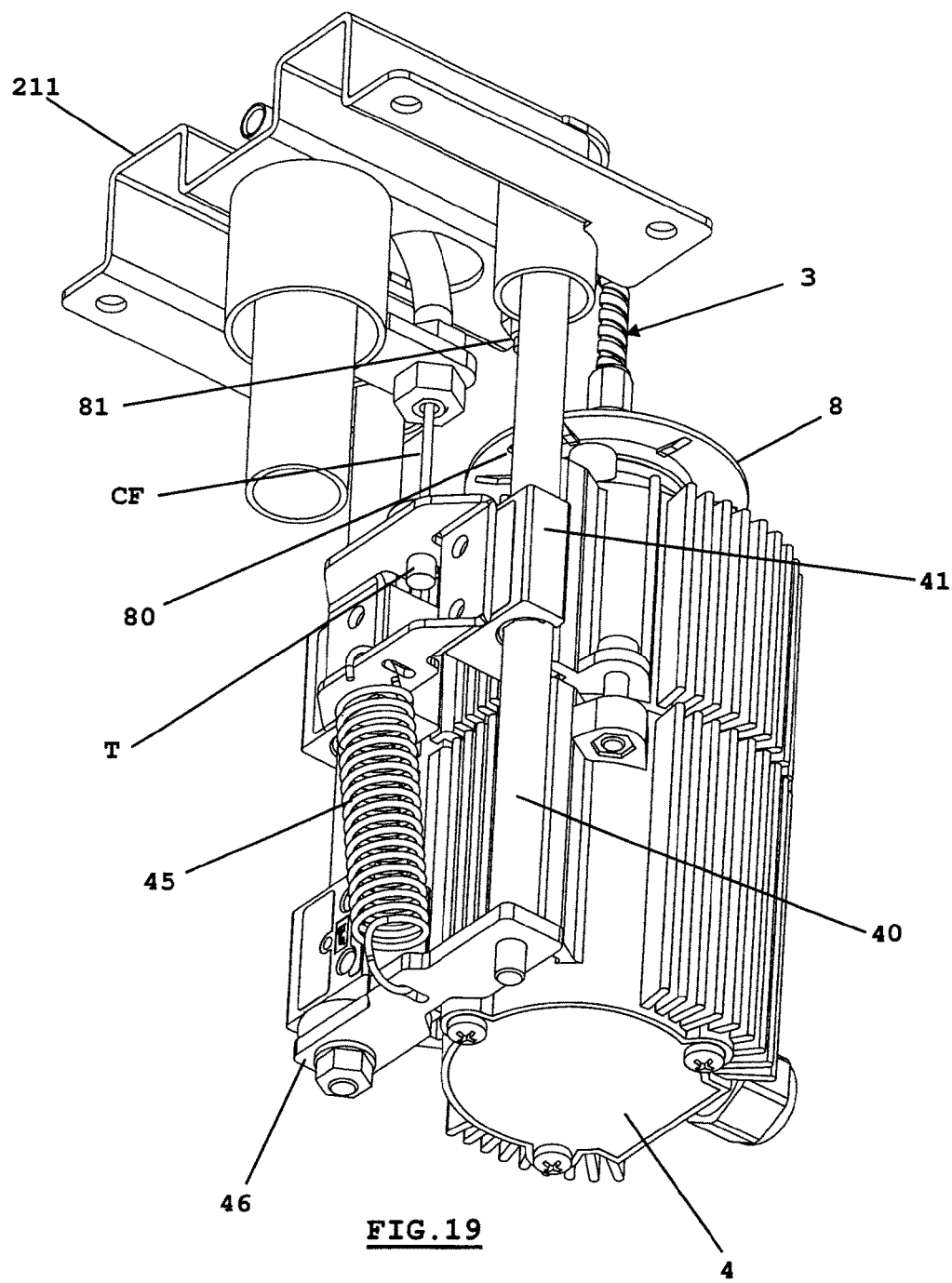

With reference to the embodiment shown in the attached drawings, with particular reference to FIG. 15, on the shaft of motor (4) is positioned a coupling tool holder (7) presenting an axial seat (70) for insertion of the shank (33) of the tool and a transverse through hole (71) which intersects said seat (70). Therefore, the chip or the coolant that eventually reach this area of the machine are expelled by centrifugal effect through the hole (71).

A machine in accordance with the present invention is usable for working various materials, including stone materials, wood (in which case the pump for the coolant is disabled), the plasterboard, plexiglass etc.

In practice the details of execution may vary according to what regards the individual elements described and illustrated, and in their mutual arrangement, without departing from the scope of the adopted solution and thus remaining within the limits of the protection granted by this patent.

The invention claimed is:

1. A machine tool, comprising:
   a base comprising a bottom and a peripheral wall of predetermined height to delimit at least a portion of an internal volume of predetermined capacity and a top of the base being open;
   a cover provided with through holes through which a refrigerant liquid is free to fall, the cover being placed on an upper edge of said peripheral wall;
   an electric motor, on which is engaged a tool holder, the electric motor being placed in said internal volume, wherein said electric motor is inserted in a protection chamber which protects the electric motor from the refrigerant liquid passing through said holes, said electric motor being connected to corresponding lowering and lifting means for lowering and lifting the tool holder such that a respective tool is lowered and lifted through the cover, wherein said protection chamber is telescopic.

2. A machine tool according to claim 1, wherein said protection chamber is sealed to provide a sealed protection chamber, said sealed protection chamber comprising a fixed part and a movable part, the fixed part being formed by a tubular internal appendix of said base and the movable part being connected to the electric motor.

3. A machine tool according to claim 1, wherein the lowering and lifting means comprises a flexible cable which, on one side, is connected to the electric motor and, on another side, is connected to a lever, said flexible cable acting as a transmission element between the lever and the electric motor.

4. A machine tool according to claim 1, wherein said electric motor and the tool holder are disposed according to a vertical axis, and the electric motor is slidably mounted on vertical guides.

5. A machine tool according to claim 1, wherein a movable part of said protection chamber is fixed to an inner surface of said cover, wherein a top portion of the movable part has two appendixes which are slidably inserted in two corresponding bushings presented by said inner surface of the cover.

6. A machine tool according to claim 2, wherein the movable part of said chamber is formed by a first element and a second element, the first element being integrally connected to a housing of the electric motor and the second element being fixed to motor shaft and positioned above the first element.

7. A machine tool according to claim 1, wherein a cutting tool is engaged on the tool holder, the cutting tool comprising a cutting head and a stem with a shank insertable in the tool holder, wherein a diameter of the cutting head is greater than a diameter of the stem.

8. A machine tool according to claim 1, wherein the tool holder has an axial seat for inserting a tool, said tool holder comprising a transverse through hole which intersects said seat.

9. A machine tool according to claim 1, wherein a movable part of said protection chamber is fixed to an inner surface of said cover, wherein a top portion of the movable part has two appendixes which are slidably inserted in two corresponding bushings presented by said inner surface of the cover.

10. A machine tool according to claim 2, wherein said movable part of said protection chamber is fixed to an inner surface of said cover, wherein a top portion of the movable part has two appendixes which are slidably inserted in two corresponding bushings presented by said inner surface of the cover.

11. A machine tool, comprising:
a base comprising a bottom and a peripheral wall of predetermined height to delimit at least a portion of an internal volume of predetermined capacity and a top of said base being open;
a cover provided with through holes through which a refrigerant liquid is free to fall, said cover being placed on an upper edge of said peripheral wall;
an electric motor, on which is engaged a tool holder, said electric motor being placed in said internal volume, wherein said electric motor is inserted in a protection chamber which protects said electric motor from said refrigerant liquid passing through said holes, said electric motor being connected to corresponding lowering and lifting means for lowering and lifting said tool holder such that a respective tool is lowered and lifted through said cover, said lowering and lifting means comprising a flexible cable which, on one side, is connected to said electric motor and, on another side, is connected to a lever, said flexible cable acting as a transmission element between said lever and said electric motor.

12. A machine tool, comprising:
a base comprising a bottom and a peripheral wall of predetermined height to delimit at least a portion of an internal volume of predetermined capacity and a top of said base being open;
a cover provided with through holes through which a refrigerant liquid is free to fall, said cover being placed on an upper edge of said peripheral wall;
an electric motor, on which is engaged a tool holder, said electric motor being placed in said internal volume, wherein said electric motor is inserted in a protection chamber which protects said electric motor from said refrigerant liquid passing through said holes, said electric motor being connected to corresponding lowering and lifting means for lowering and lifting said tool holder such that a respective tool is lowered and lifted through said cover, wherein a movable part of said protection chamber is fixed to an inner surface of said cover, wherein a top portion of said movable part has two appendixes which are slidably inserted in two corresponding bushings presented by said inner surface of said cover.

* * * * *